United States Patent [19]
Graham

[11] Patent Number: 5,611,423
[45] Date of Patent: Mar. 18, 1997

[54] CLAMP NUT ARRANGEMENT FOR MOUNTING A FEEDER BOWL TO A VIBRATORY DRIVE UNIT

[76] Inventor: S. Neal Graham, 12997 Fawns Ridge, Fishers, Ind. 46038

[21] Appl. No.: 425,908

[22] Filed: Apr. 20, 1995

[51] Int. Cl.$^6$ ................................................. B65G 27/02
[52] U.S. Cl. ................................................. 198/757
[58] Field of Search ................................ 198/756, 757

[56] References Cited

U.S. PATENT DOCUMENTS

| | | |
|---|---|---|
| 3,011,625 | 12/1961 | Bailey et al. . |
| 3,032,174 | 5/1962 | Lake et al. . |
| 3,258,111 | 6/1966 | Spurlin et al. . |
| 3,500,993 | 3/1970 | Tarzian . |
| 3,599,783 | 8/1971 | Burgess, Jr. . |
| 3,658,172 | 4/1972 | Hacker . |
| 3,700,094 | 10/1972 | Parr ........................................ 198/757 |
| 3,724,647 | 4/1973 | Ledoux .................................. 198/757 |
| 4,181,216 | 1/1980 | Cipu . |
| 5,210,544 | 5/1993 | Jones et al. . |
| 5,314,058 | 5/1994 | Graham . |

FOREIGN PATENT DOCUMENTS

| | | | |
|---|---|---|---|
| 1456805 | 12/1968 | Germany | ............................. 198/757 |
| 919159 | 2/1963 | United Kingdom . | |

*Primary Examiner*—James R. Bidwell
*Attorney, Agent, or Firm*—Woodard, Emhardt, Naughton, Moriarty & McNett

[57] ABSTRACT

A vibratory drive unit includes a base member, a top member and a plurality of drive springs connected therebetween. A plurality of channels are defined within a top surface of the top member for non-rotatingly receiving a corresponding plurality of clamp nuts therein. Each of the channels includes a threaded bore axially aligned with a similar bore through a corresponding clamp nut for receiving a threaded fastener therein. A circumferential flange extending downwardly from the parts feeder bowl is clamped between the top member and the plurality of clamp nuts as the fasteners are threadingly advanced. The clamp nuts are positioned relative to the drive unit to thereby transfer maximum vibratory action to the parts feeder bowl. Extension blocks are further provided for receipt within the channels and are configured to permit a parts feeder bowl having a larger diameter flange to be mounted to the vibratory drive unit.

29 Claims, 7 Drawing Sheets

CLAMP NUT ARRANGEMENT FOR MOUNTING A FEEDER BOWL TO A VIBRATORY DRIVE UNIT

FIELD OF THE INVENTION

The present invention relates generally to the field of article feed mechanisms and sorters, and more specifically to vibratory parts feeders having an attached vibratory feeder bowl.

BACKGROUND OF THE INVENTION

Vibratory feeder bowls and parts separators typically urge parts upwardly along a helical parts path by vibrating the helical path both axially along, and rotationally about, its central axis. A vibratory drive unit is required to impart the necessary vibratory feed motion to the feeder bowl.

In the design of a vibratory parts feeder, an established industry practice is to attach the feeder bowl to a top member of the drive unit, wherein the top member and a stationary base member of the drive unit are connected by a plurality of drive springs. Vibratory action is created at the base member, by suitable means, which is transferred to the top member via the drive springs. By establishing an appropriate vibratory direction, and properly positioning the drive springs, the feeder bowl is made to vibrate in either a clockwise or counter clockwise direction. Parts within the feeder bowl are then correspondingly transported upwardly along the helical parts path to a bowl exit location.

Designers of vibratory parts feeders have utilized several approaches in attaching a feeder bowl to a drive unit. One such prior art approach is shown with respect to the vibratory parts feeder 10 of FIG. 1. Referring to FIG. 1, a feeder bowl 12 is attached to a drive unit 20 by means of clamp nuts 14. The drive unit 20 includes a base member 22 and a top member 24. A number of drive springs 26 are connected between the base member 22 a corresponding number of spring pads 28 of top member 24. At least one vibratory driver 30 generates vibratory action at the base member 22 which is transmitted to the top member 24 via the drive springs 26. The clamp nuts 14 are adjustably mountable to the top member 24 by fasteners 16. The fasteners 16 may be adjustably positioned relative to the top member 24 to thereby clamp a lower flange 18 of the feeder bowl 12 to a vertical wall 32 of the top member 24.

It is also known in the vibratory parts feeding industry to provide vibratory drive units, such as drive unit 20 of FIG. 1, with the ability to vibrate parts within bowl 12 in either a clockwise or counter-clockwise direction. As shown in FIG. 1, drive springs 26 are attached to spring pads 28 of top member 24, and to spring pads 29 of base member 22, to thereby provide vibratory action in one direction. However, drive springs 26 may alternatively be attached to spring pads 28' of top member 24, and to spring pads 29' of base member 22, to thereby provide vibratory action in an opposite direction. Thus, vibratory parts feeder 10 is configurable for bidirectional vibratory motion depending upon the attachment locations of drive springs 26. An example of such a bidirectional vibratory drive unit is shown and described in applicant's U.S. Pat. No. 5,314,058, the contents of which are hereinafter incorporated by reference.

Although the foregoing clamp nut approach facilitates the easy removal, positioning and attachment of feeder bowls 12 to the drive unit 14, it has several inherent drawbacks. First, efficiency in transmission of vibratory action through the drive springs 26 to the feeder bowl 12 is dependent upon the location of the spring pads 28 relative to the weight of the top member 24. Generally, the less top member 24 weight located above the spring pads 28, the more efficient the transmission of vibratory action. In the vibratory parts feeder 10 of FIG. 1, the bulk of the clamp nuts 14 are located above the spring pads 28, thereby decreasing vibratory transmission efficiency.

Secondly, in adjusting or replacing a feeder bowl 12, the clamp nuts 14 must be loosened. Unless the clamp nuts 14 are manually held in position, they may rotate when being loosened or tightened so that the bulk of the clamp nuts 14 are directed downwardly toward the base member 22. The same may occur if the vibratory action of the parts feeder 10 works the clamp nuts 14 loose. Since three or more clamp nuts 14 are typically used with the vibratory parts feeder 10, repeated repositioning of the clamp nuts 14 becomes a tedious and laborious task.

Thirdly, the lower flange 18 of the feeder bowl 12 is in constant contact with the fasteners 16 in the vibratory parts feeder 10 shown in FIG. 1. Since the fasteners are often threaded bolts, such constant contact, particularly when removing, adjusting or replacing a feeder bowl 12, may strip the threads thereby requiring periodic replacement of fasteners 16.

Finally, the clamp nut arrangement of FIG. 1 may accommodate only one size of feeder bowls 12. An application specifying a differently sized feeder bowl 12 requires that an appropriately sized drive unit 20 be provided as well. As a result, users of vibratory parts feeders must keep an inventory of multiple-sized drive units for use with the various feeder bowls. Such an inventory can be expensive to establish, store, and maintain.

What is therefore needed is an easily adjustable clamp nut arrangement for a vibratory parts feeder that maximizes transfer of vibratory efficiency while minimizing parts wear. Ideally, such a parts feeder should further accommodate various sized feeder bowls.

SUMMARY OF THE INVENTION

The foregoing limitations and shortcomings of the prior art are addressed by the vibratory drive unit of the present invention.

In accordance with one aspect of the present invention, a vibratory drive unit for cooperative engagement with a parts feeder bowl having a bottom wall and an outside wall connected thereto, the bottom wall having a flange extending therefrom, comprises a base member, a top member positioned above the base member, and a plurality of drive springs connected between the base member and the top member, wherein each of the drive springs are attached to the top member at a spring pad location. Also included are a plurality of clamps clamping the flange of the parts feeder bowl to the top member, wherein each of the clamps have a mass centered substantially level with said spring pads. Finally, means are included for vibrating the top member relative to the base member.

In accordance with another aspect of the present invention, a vibratory drive unit for cooperative engagement with a parts feeder bowl having a bottom wall and an outside wall connected thereto, the bottom wall having a flange extending therefrom, comprises a top member for mounting the parts feeder bowl thereto, means for vibrating the top member, a plurality of clamp nuts for clamping the flange of the parts feeder bowl to the top member, and a fastener engageable between each of the clamp nuts and the top member for adjustably clamping the flange therebetween. The top member and the clamp nuts are matingly configured to prevent rotation of the clamp nuts as the flange is adjustably clamped therebetween.

In accordance with a further aspect of the present invention, a vibratory drive unit for cooperative engagement with a parts feeder bowl having a bottom wall and an outside wall extending therefrom in a first direction to an open top, the bottom wall having a flange extending therefrom in a second direction opposite the first direction, comprises a top member for mounting the parts feeder bowl thereto, means for vibrating the top member, a plurality of clamp nuts for clamping the flange of the parts feeder bowl to the top member, and a fastener engageable between each of the clamp nuts and the top member for adjustably clamping the flange therebetween. The top member defines a flange support surface between the flange and the fastener to prevent the flange from contacting the fastener as the feeder bowl is mounted to the top member.

In accordance with yet another aspect of the present invention, a vibratory parts feeder for cooperative engagement with a parts feeder bowl having a bottom wall and a cylindrical outside wall connected thereto, the bottom wall having one of a first diameter circumferential flange and a second larger diameter circumferential flange extending therefrom, comprises a top member adaptable for mounting the parts feeder bowl thereto, means for vibrating said top member, a plurality of clamp nuts for clamping one of the first and second diameter flanges to the top member, and a fastener engageable between each of the clamp nuts and the top member for adjustably clamping one of the first and second diameter flanges therebetween.

One object of the present invention is to provide clamp nut arrangement for mounting a parts feeder bowl to a vibratory drive unit such that maximum vibratory action is transferred from the drive unit to the parts feeder bowl.

Another object of the present invention is to provide a clamp nut arrangement for mounting a parts feeder bowl to a vibratory drive unit such that the clamp nuts are restricted from rotating relative to the drive unit as the parts feeder bowl is mounted thereto.

Yet another object of the present invention is to provide a clamp nut/fastener arrangement for mounting a parts feeder bowl to a vibratory drive unit wherein the parts feeder bowl is supported by a portion of the drive unit away from the clamp nut fastener.

A further object of the present invention is to provide a vibratory drive unit adaptable to mount a variable diameter parts feeder bowl thereto.

These and other objects of the present invention will become more apparent from the following description of the preferred embodiment.

DESCRIPTION OF THE PREFERRED EMBODIMENT

Figure 1:
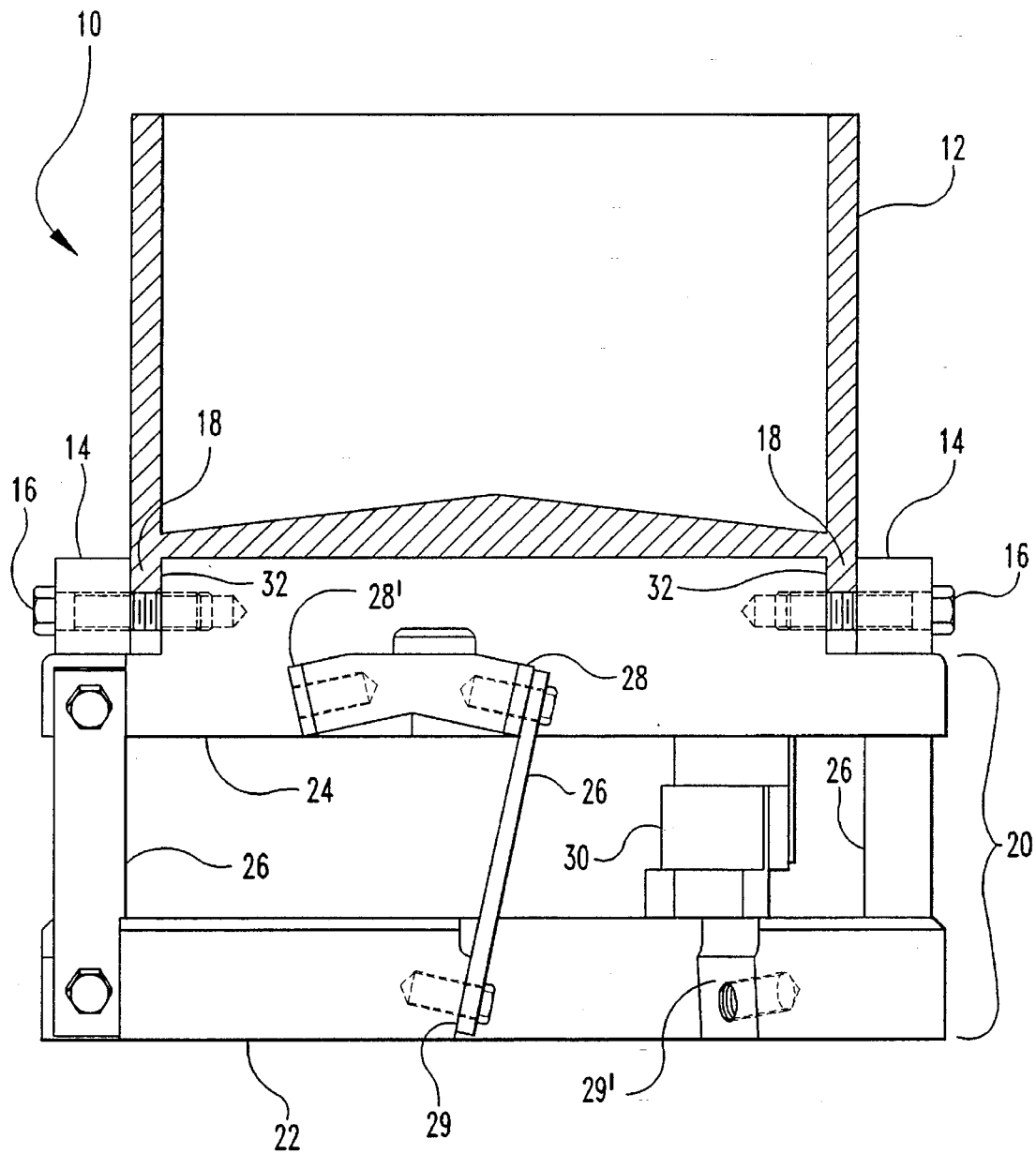
FIG. 1 is a side elevational view of a known clamp nut arrangement for mounting a parts feeder bowl to a vibratory drive unit.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
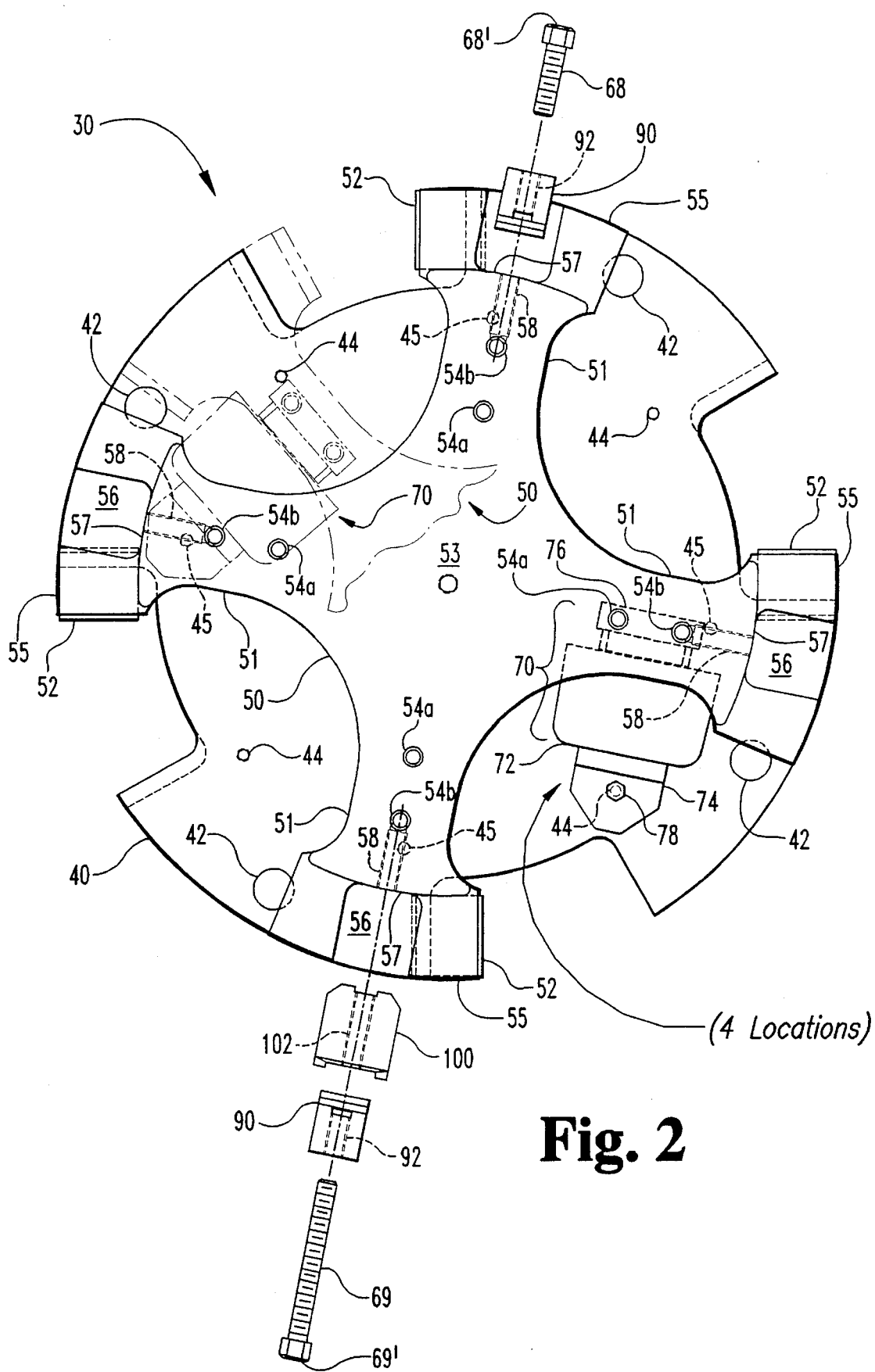
FIG. 2 is a top plan view of a vibratory drive unit in accordance with the present invention.

Referring now to FIG. 2, a vibratory drive unit 30, in accordance with the present invention, is shown. Vibratory drive unit 30 includes a base member 40 and a top member 50 with a plurality of drive springs 52 connected therebetween. Drive springs 52 provide both means for supporting top member 50 approximately level above base member 40, and means for biasing top member 50 relative to base member 40. In a preferred embodiment, four drive springs 52 are connected between base member 40 and top member 50, spaced opposite each other at 90 degree intervals. Base member 40 includes a plurality of bores 42 therethrough (preferably 4) for receiving fasteners (not shown) therein to rigidly secure base member 40 to a surface such as, for example, a table top.

Means for rotating hop member 50 relative to base member 40 is provided by a plurality of electromagnetic drive devices 70. Each of the electromagnetic drive devices 70 includes an electromagnetic driver 72 mounted to base member 40 via an L-shaped bracket 74. Preferably, a threaded fastener 78 is provided to secure bracket 74 to threaded bore 44 located within base member 40. Electromagnetic drive device 70 further includes a striker plate 76 mounted to top member 50. Preferably, four electromagnetic drive devices 70 are mounted to base member 40 and top member 50 at 90 degree intervals corresponding to the four drive springs 52. Each of the electromagnetic drivers 72 includes a conventional electrical coil mounted to base member 40 via L-shaped bracket 74, and each of the striker plates 76 is mounted to top member 50 via a pair of fasteners 54a and 54b, such that the striker plate 76 is positioned adjacent to a corresponding electromagnetic driver 72.

Electromagnetic drive devices 70 operate in a conventional manner by providing an electromagnetic field when electromagnetic drivers 72 are energized to attract striker plates 76, thereby rotating top member 50 relative to base member 40 against the combined spring force provided by drive springs 52. A second set of bores 45 are provided for mounting electromagnetic drive devices 70 thereto, in an opposite orientation with respect to electromagnetic drive devices 70, as will be more fully described hereinafter.

Figure 3:
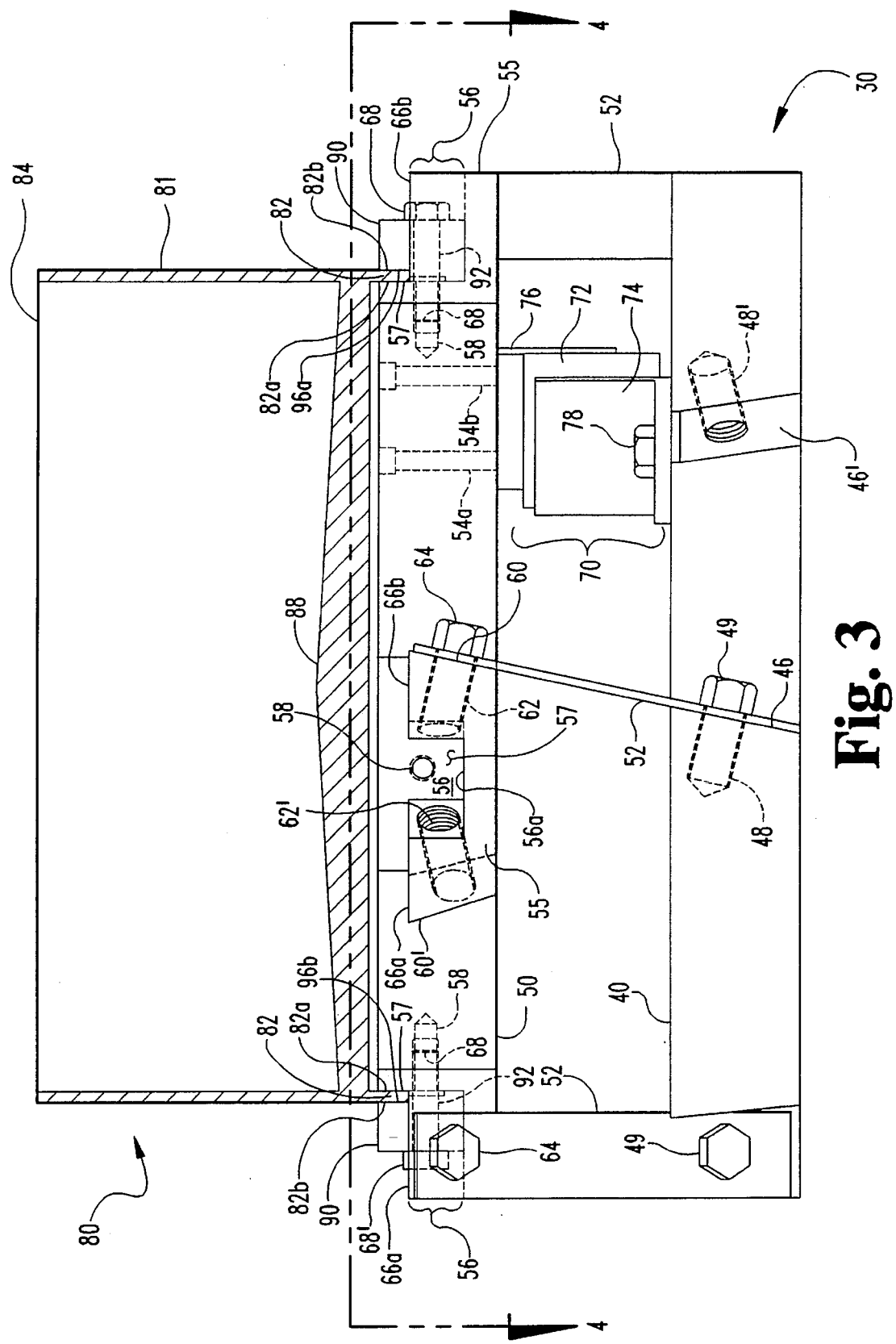
FIG. 3 is a side elevational view of the vibratory drive unit of FIG. 2 showing a first diameter parts feeder bowl clamped thereto.
Figure 5:
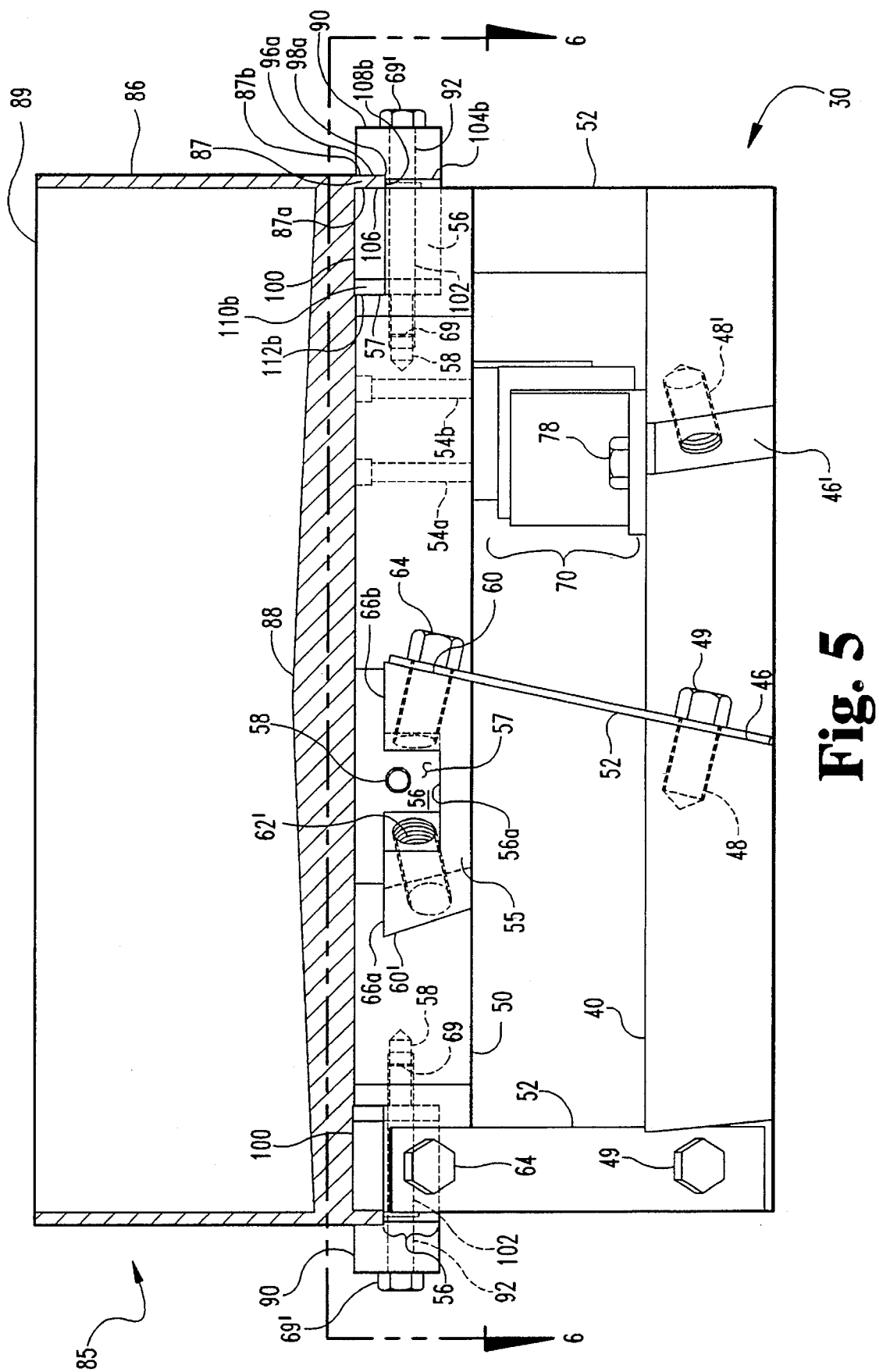
FIG. 5 is a side elevational view of the vibratory drive unit of FIG. 2 showing a second larger diameter parts feeder bowl clamped thereto.

Referring now to FIGS. 2, 3 and 5, drive springs 52 are mounted at an angle corresponding to the driven direction of rotation. Each drive spring 52 is connected to a spring pad location 60 of top member 50 by a fastener 64. Similarly, each drive spring 52 is connected to a corresponding spring pad location 46 of base member 40 by a fastener 49. Preferably, spring pad locations 60 and 46 include threaded bores 62 and 48, respectively, therethrough for receiving correspondingly threaded fasteners 64 and 49, respectively. Because drive springs 52 are mounted at an angle corresponding to the driven direction of rotation, drive springs 52 also move top member 50 vertically way from base member 40 when electromagnetic drivers 72 are energized. When electromagnetic drivers 72 are de-energized, drive springs 52 release top member 50 to move in an opposite vertical direction and to rotate top member 50 in an opposite direction to return it to its initial position. By cycling electromagnetic drivers 72 between energized and de-energized states, electromagnetic drive devices 70 cooperate with drive springs 52 to induce both an axial and rotational vibratory or oscillating motion in top member 50 relative to base member 40.

As most clearly shown in FIGS. 3 and 5, top member 50 includes an oppositely configured spring pad location 60' corresponding to every spring pad location 60. Similarly, base unit 40 defines an oppositely configured spring pad location 46' corresponding to each spring pad location 46. Thus, drive springs 52 may be alternatively attached between spring pad locations 60' and 46' to thereby provide rotational vibratory motion in a direction opposite to that previously described. Preferably, spring pad locations 60' and 46' include threaded bores 62' and 48' therethrough, respectively, for threadingly receiving threaded fasteners 64 and 49, respectively.

Attaching drive springs 52 between spring pad locations 60' and 46' requires the top member 50 to be rotated relative to base member 40 so that it assumes the position shown in phantom (and in partial cutaway) in FIG. 2. So rotating top member 50 causes threaded bores 45 in base member 40 to be properly aligned for mounting drive unit 70 thereto to thereby vibrate top member 50 in the direction opposite to that previously described. Thus, vibratory drive unit 30 may be appropriately configured to provide either a clockwise or counterclockwise motion of top member 50 relative to base member 40.

Figure 4:
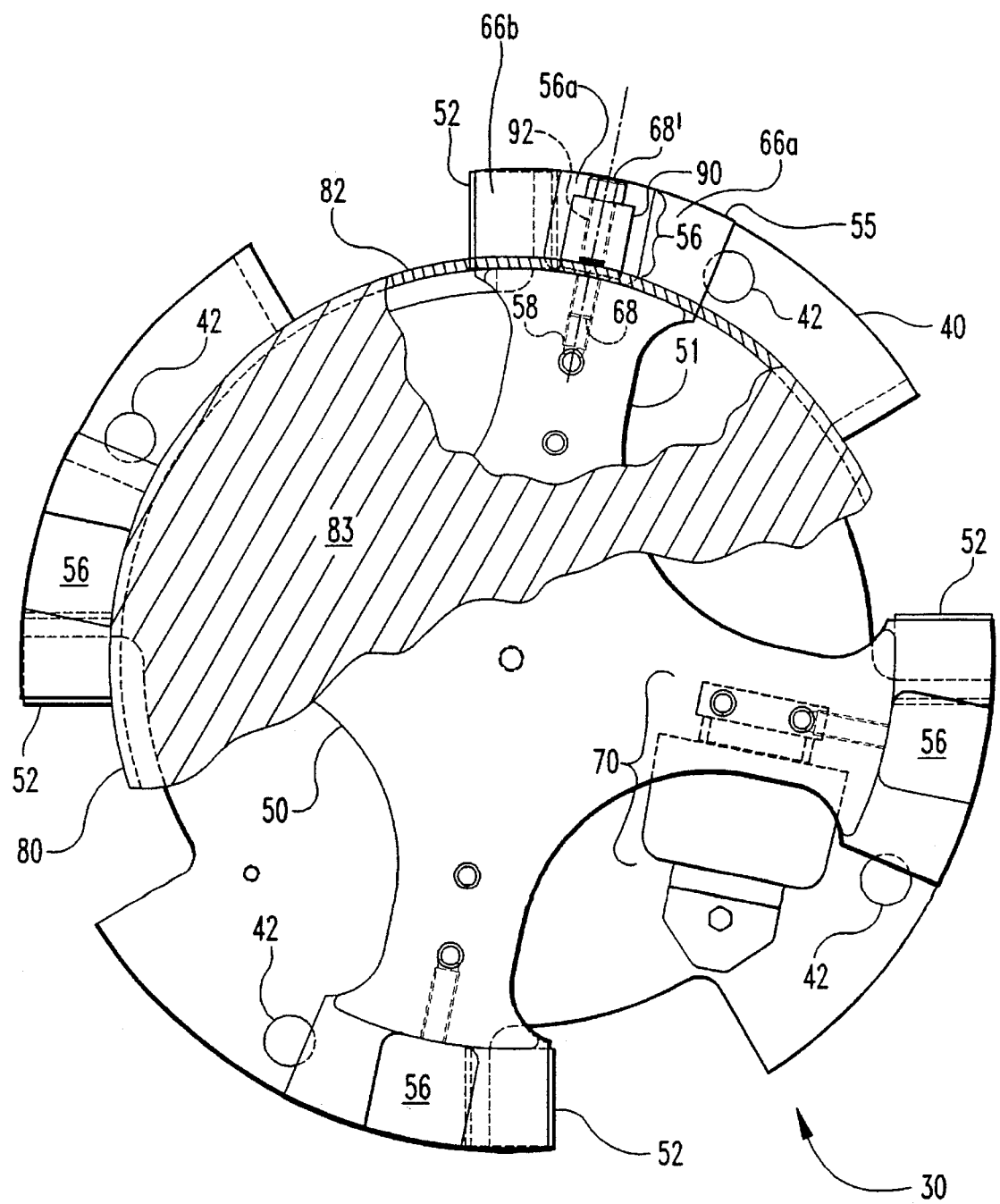
FIG. 4 is a cross-sectional view of the vibratory drive unit of FIG. 3 along section lines 4—4.
Figure 6:
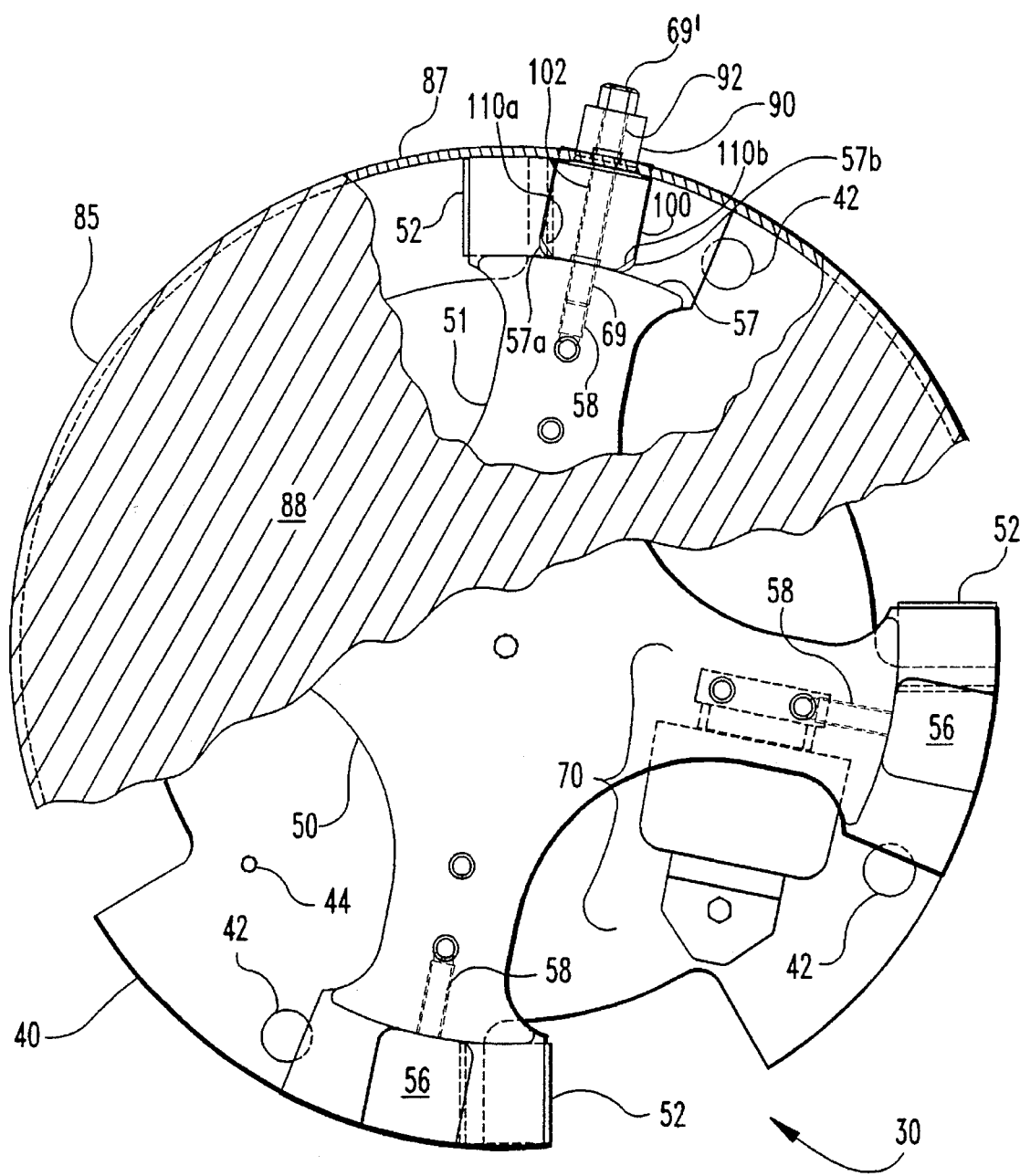
FIG. 6 is a cross-sectional view of the vibratory drive unit of FIG. 5 along section lines 6—6.

Referring again to FIG. 2, top member 50 includes a plurality of cross-arms or spokes 51 extending radially from a central portion 53. Preferably, four cross-arms or spokes 51 are provided corresponding to the number of drive springs 52. Each spoke 51 further includes a striker plate 76 mounted therebeneath and disposed adjacent to a corresponding electromagnetic driver 72. Striker plates 76 are bidirectional; that is, each side of the striker plate 76 provides a surface for operable engagement with a corresponding electromagnetic driver 72. As such, top member 50 may be rotated in a clockwise direction relative to base member 40 by attaching drive springs 52 to spring pad locations 60 and 46, as shown in FIGS. 3 and 5, and by mounting electromagnetic drivers 72 to driver mounting locations 45 via an appropriate fastener 78, as shown in FIGS. 2, 4, and 6. Alternatively, top member 50 may be configured for counterclockwise rotation relative to base member 40 by attaching drive springs 52 between spring pad locations 60' and 46', and by mounting electromagnetic drivers 72 to base member 40 at mounting locations 45 as shown in phantom in FIG. 2. Each spoke 51 further includes a radial end 55 having alternative spring pad locations 60 and 60' on opposite sides thereof (FIGS. 3 and 5), and defining an open-ended channel 56 extending toward central portion 53 of top member 50. Each of the channels 56 terminates at a vertical surface 57 of top member 50. A bore 58, preferably threaded, extends from vertical surface 57 inwardly toward central portion 53 of top member 50. Each of the channels 56 is configured for slidingly receiving either a clamp nut 90 or an extension block 100 therein as will be more fully described hereinafter. In either case, both clamp nuts 90 and extension blocks 100 include bores 92 and 102, respectively, therethrough for slidingly receiving either a threaded bolt 68 or threaded bolt 69. As shown in FIG. 2, threaded bolt 68 is slidingly received within bore 92 of clamp nut 90, and threadingly received within bore 58 of top member 50, to thereby adjustably position clamp nut 90 relative to top member 50. As will be more fully discussed hereinafter, clamp nuts 90 and threaded bolts 68 may be adjustably positioned to clamp a parts feeder bowl having a first diameter between the clamp nuts 90 and corresponding vertical wall portions 57 of top member 50. Similarly, as will be more fully described hereinafter, extension blocks 100, clamp nuts 90, and threaded bolts 69 may be used to adjustably clamp a parts feeder bowl having a second larger diameter between clamp nuts 90 and extension blocks 100.

Referring specifically now to FIGS. 3 and 4, vibratory drive unit 30 is shown having a parts feeder bowl 80 clamped thereto. Parts feeder bowl 80 is cylindrical in shape and has a circular bottom 83 connected to cylindrical sides 81 which extend upwardly in a first direction toward an open top 84. Parts feeder bowl 80 further includes a cylindrical flange 82 having a first diameter and extending away from bottom 83 in a second direction opposite the first direction. Flange 82 may be attached to the bottom 83 of parts feeder bowl 80, or may be a uniform extension of cylindrical sides 81 as shown in FIG. 3. In either case, flange 82 has a predetermined first diameter which is preferably 12 inches. Although not shown in detail in the drawings, parts feeder bowl 80 may be of variable depth and may include a helical parts path therein as is known in the art.

Flange 82 includes an inner flange surface 82a which is positioned in contacting relationship with vertical radial surface 57 of top member 50 when the parts feeder bowl 80 is mounted thereto. A clamp nut 90 and corresponding threaded bolt 68 are then slidingly received within each of the channels 56 to thereby clamp the flange 82 of the feeder bowl 80 to the top member 50 of the vibratory drive unit 30.

Figure 7A:
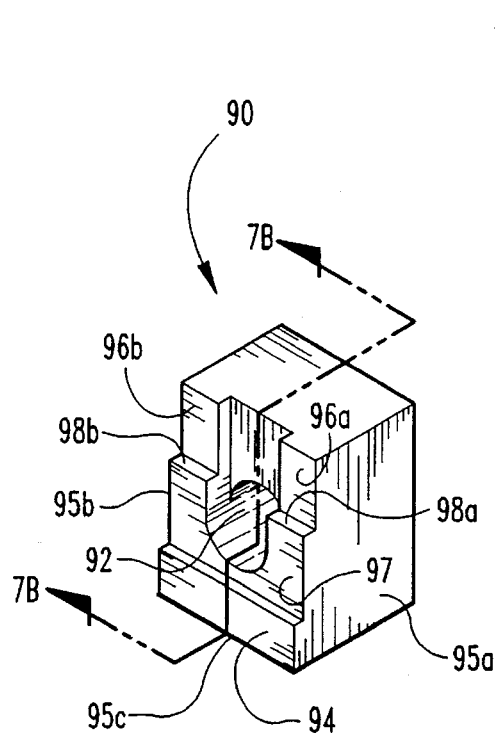
FIG. 7A is a perspective view of a clamp nut, in accordance with the present invention, for use with the clamp nut arrangement shown in FIGS. 2–6.
Figure 7B:
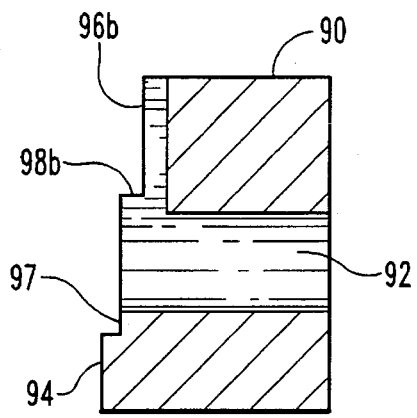
FIG. 7B is a cross-sectional view of the clamp nut of FIG. 7A along sections lines 7B—7B.

Referring now to FIGS. 7A and 7B, the clamp nut 90 features are shown in detail. Clamp nut 90 defines a bore 92 therethrough sized to slidingly receive the threaded shaft portion of either threaded bolt 68 or threaded bolt 69 therein, yet disallow passage therethrough of the head portion 68' and 69', respectively. Clamp nut 90 further defines a vertical radial clamping face 94 which steps upward to a recessed face 97 which then steps up to a pair of further recessed clamping faces 96a and 96b. A pair of horizontal support surfaces 98a and 98b are defined between recessed clamping faces 96a and 96b, respectively, and face 97. Preferably, clamp nut 90 is rectangular in shape, having vertical sides 95a and 95b as well as horizontal bottom surface 95c, although the present invention contemplates that clamp nut 90 may have other polygonal shapes as will be discussed in greater detail hereinafter.

Referring again to FIGS. 3 and 4, the operation of clamp nuts 90 will now be described in detail. After parts feeder bowl 80 is mounted to the top member 50 such that the interior surface 82a of flange 82 is in contacting relationship with vertical radial surface 57 of top member 50, the clamp nuts 90 and corresponding threaded bolts 68 are slidingly received within channels 56. As the threaded bolts 68 are advanced into the threaded bores 58, clamping faces 96a and 96b of each of the clamp nuts 90 contacts the outer surface 82b of the flange 82. Threaded bolts 68 may be adjustably positioned (tightened) within bores 58 to thereby clamp flange 82 between the vertical surface 57 of top member 50 and vertical clamp faces 96a and 96b of the clamp nuts 90, to achieve a desired clamping force therebetween. Radial face 94 is configured to be in contacting relationship with vertical surface 57 of top member 50 when the clamp nut 90 is adjustably positioned to its clamping position shown in FIG. 3. Such a configuration promotes greater surface area contact between clamping faces 96a and 96b of clamp nut 90 and outer surface 82b of flange 82. In other words, radial face 94 is operatively associated with vertical surface 57 of top member 50 to maintain clamping surfaces 96a and 96b in their optimally vertical positions. Support surfaces 98a and 98b of clamp nut 90 are not necessarily required for the clamping arrangement illustrated in FIGS. 3 and 4. These surfaces and their functionality will be described in greater detail with respect to the embodiment illustrated in FIGS. 5 and 6. In the embodiment shown in FIGS. 3 and 4, support surfaces 98a and 98b are preferably positioned level with support surfaces 66a and 66b located on opposite sides of each channel 56.

The clamp nut arrangement for mounting parts feeder bowl 80 to vibratory drive unit 30, as shown in FIGS. 3 and 4, includes at least three important advantages over prior art clamp nut arrangements. First, the mass of each clamp nut 90 is positioned substantially level with spring pads 60 and 60'. Such an arrangement significantly lowers the amount of weight of top member 50 located above spring pads 60 and 60', corresponding to greater efficiency in the transfer of vibratory motion from base member 40 to top member 50.

Secondly, the bottom surface 95c of each clamp nut 90, and each channel surface 56a are configured substantially flat. Thus, as the clamp nuts 90 are slidably received within the corresponding channels 56, and threaded bolts 68 are advanced or retracted within threaded bores 58, surfaces 95c of clamp nuts 90 and 56a of channels 56 prevent clamp nuts 90 from rotating relative to top member 50. Such a feature is advantageous in that it automatically maintains clamping faces 96a and 96b of clamp nuts 90 in their respective clamping positions. This feature thus presents a limitation on the shape of clamp nuts 90, in that they must be correspondingly configured with surface 56a of channel 56 to thereby prevent rotation of clamp nuts 90 relative to top member 50. Practically speaking, the bottom 95c of clamp nut 90 need not be flat as shown in the figures, but may assume any shape that is operable with a matingly shaped surface 56a of channel 56 to prevent relative rotation therebetween.

Finally, the radial ends 55 of top member 50 each define horizontal support surfaces 66a and 66b positioned on either side of channel 56. Support surface 66a and 66b are operable to support flange 82 of parts feeder bowl 80, thereby preventing the flange 82 from contacting the threaded shaft of any of the threaded bolts 68. Such a feature helps prevent threaded bolts 68 from becoming stripped from the pressure of flange 82 resting thereon, thereby prolonging their useful life.

Referring now to FIGS. 5 and 6, a clamp nut arrangement is shown for mounting a parts feeder bowl 85 having a second larger diameter to vibratory drive unit 30. Parts feeder bowl 85 is cylindrical in shape and has a circular bottom 88 attached to cylindrical sides 86 which extend in a first direction upwardly toward an open top 89. A cylindrical flange 87 extends away from bottom 88 in a second direction opposite the first direction. As with parts feeder bowl 80, parts feeder bowl 85 may be of unitary construction or may have a separately provided bottom 88, cylindrical side 86, and flange 87 for subsequent attachment as described. In any case, parts feeder bowl 85 includes a cylindrical flange 87 having a predetermined diameter larger than flange 82 of parts feeder bowl 80. In a preferred embodiment, flange 87 has a diameter of 15 inches.

Bottom member 40, top member 50, electromagnetic drive unit 70, and clamp nuts 90 are identical with those components previously discussed with respect to FIGS. 2–4, 7A, and 7B, and will therefore not be discussed further.

Since flange 87 of parts feeder bowl 85 is larger in diameter than flange 82 of parts feeder bowl 80, an extension block 100 is slidably received within each channel 56 to thereby provide a clamping surface similar to clamping surface 57 of top member 50. In other words, extension blocks 100 effectively act to extend the flange clamping surface 57 of top member 50 outwardly from center portion 53.

Figure 8A:
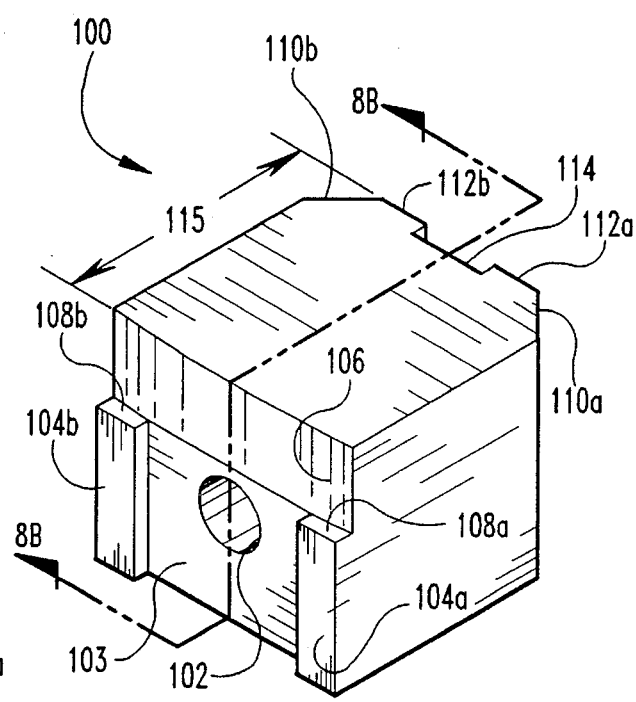
FIG. 8A is a perspective view of an extension block, in accordance with the present invention, for use with the clamp nut arrangement shown in FIGS. 2, 5 and 6.
Figure 8B:
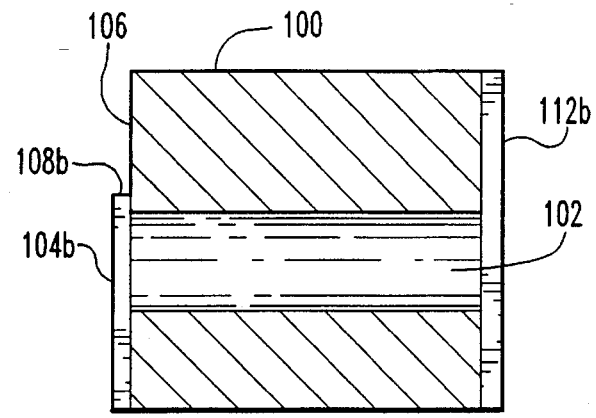
FIG. 8B is a cross-sectional view of the extension block of FIG. 8A along section lines 8B—8B.

Referring to FIGS. 8A and 8B, extension block 100 defines a bore 102 therethrough which is sized substantially identical to bore 92 of clamp nut 90. In operation, a threaded bolt 69 is slidably received within bore 92 of clamp nut 90, bore 102 of extension block 100, and threadingly received within threaded bore 58 to thereby adjustably position clamp nut 90 relative to extension block 100.

Extension block 100 further includes a vertical radial clamping face 106 which receives the inner surface 87a of flange 87 in contacting relationship when parts feeder bowl 85 is mounted to top member 50 with extension blocks 100 positioned within channels 56. Vertical clamping face 106, in the embodiment shown in FIGS. 5 and 6, corresponds to vertical radial clamping surface 57 as previously discussed. Extension block 100 further includes a pair of flange 104a and 104b extending away from vertical face 106 on either side of bore 102 with a vertical and radial surface 103 therebetween. Flanges 104a and 104b each terminate in horizontal support surfaces 108a and 108b, respectively. The rear of extension block 100 includes angled portions 110a and 110b which terminate in a pair of radial faces 112a and 112b, respectively. Edges 110a and 110b are angled to approximate the rounded corners 57a and 57b of channel 56, as most clearly seen in FIG. 6. In this way, radial faces 112a and 112b come into contacting relationship with radial surface 57 of radial end 55 when extension block 100 is slidably received with channel 56. A notched portion 114 is further provided between radial surfaces 112a and 112b having a width approximately equal to the diameter of bore 102. Practically speaking, extension block 100 may have a variable length 115 to thereby accommodate a parts feeder bowl 85 having a flange 87 which has any diameter larger than the diameter of flange 82 of parts feeder bowl 80. In other words, the length 115 of extension block 100 may be sized to permit a parts feeder bowl flange to be clamped to radial clamping face 106, wherein the flange of the parts feeder bowl has any inner diameter larger than that of parts feeder bowl 80 of FIGS. 3–4.

As most clearly shown in FIGS. 5, 7A and 8A, horizontal support surfaces 98a and 98b of clamp nut 90, and horizontal support surfaces 108a and 108b of extension block 100, provide surfaces for supporting flange 87 of parts feeder bowl 85. As with the previous embodiment, bore 102 of extension block 100, and bore 92 of clamp nut 90, are positioned below surfaces 98a, 98b, 108a, and 108b so that flange 87 does not contact the threaded shaft of threaded bolt 69 when the flange 87 of parts feeder bowl 85 is clamped between clamp nut 90 and extension block 100.

In the embodiment shown in FIGS. 5–6, radial face 94 of clamp nut 90 serves two functions. First, as with the embodiment shown in FIGS. 3–4, radial surface 94 provides an extension approximately equal to the width of flange 87 so that clamping surface 96a and 96b remain substantially vertical when clamping the outer surface flange 87b of flange 87 to extension block 100. Secondly, sides 95a and 95b of radial face 94 are operatively associated with flanges 104a and 104b to provide an anti-rotation mechanism so that clamp nuts 90 will not rotate relative to extension blocks 100 when clamping a flange 87 therebetween. When parts feeder bowl 85 is mounted to top unit 50, the inner surface 87a of flange 87 contacts radial clamp surface 106 of extension block 100. Flange 87 (and consequently parts feeder bowl 85) is then supported by horizontal support surfaces 108a and 108b of extension block 100. As threaded bolt 69 is slidingly received within bore 92, bore 102, and initially threadingly engaged with threaded bore 58, clamp nut 90 is free to rotate about threaded bolt 69. However, as threaded bolt 69 is advanced into threaded bore 58, the bolt head 69' forces sides 95a and 95b of radial surface 94 between flanges 104a and 104b such that radial surface 94 is adjacent vertical radial surface 103 of extension block 100. Although parts feeder bowl 85 may be mounted to, and unmounted from, top member 50 prior to further threadingly advancing fastener 69, clamp nut 90 is thus restricted by flanges 104a and 104b from rotating about threaded bolt 69 relative to extension block 100. As with the embodiment discussed with referenced FIGS. 3–4, this feature permits automatic alignment of clamp nuts 90 relative to flange 87 and top member 50. Threaded bolt 69 may be thereafter threadingly advanced into threaded bore 58 to thereby clamp flange 87 between clamping surfaces 96a and 96b of clamp nut 90 and radial clamping surface 106 of extension block 100. In addition, the mass of each extension block 100, as well as the mass of each clamp nut 90, is positioned substantially level with spring pages 60 and 60' to thereby maximize transfer of vibratory motion from base member 40 to top member 50, as previously discussed.

The anti-rotation mechanism between the sides 95a and 95b of radial surface 94 and flanges 104a and 104b of extension block 100 provide a second limitation on the shape of clamp nut 90 and extension block 100. Although both clamp nut 90 and extension block 100 are shown as being substantially rectangular in shape, the present invention contemplates that either the clamp nut 90 or extension block 100 may assume any shape as long as each component is configured relative to surface 56a of channel 56 to prevent relative rotation therebetween when either component is slidingly received within channel 56, and are further configured to prevent relative rotation between clamp nut 90 and extension block 100 when clamping flange 87 of parts feeder bowl 85 therebetween.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vibratory drive unit for cooperative engagement with a parts feeder bowl having a bottom wall and an outside wall connected thereto, the bottom wall having a flange extending therefrom, the vibratory drive unit comprising:

a base member;

a top member positioned above said base member and configured to support the flange of the parts feeder bowl thereon;

a plurality of drive springs connected between said base member and said top member, each of said drive springs being attached to said top member at a spring pad location;

a plurality of clamps clamping the flange of the parts feeder bowl to said top member, each of said clamps having a mass centered substantially level with said spring pads; and means for vibrating said top member relative to said base member.

2. The vibratory drive unit of claim 1 wherein the outside wall of the feeder bowl extends away from the bottom wall in a first direction to an open top;

and wherein the flange extends away from said bottom wall in a second direction opposite to said first direction.

3. The vibratory drive unit of claim 2 further including a fastener engageable between each of said plurality of clamps and said top member for adjustably securing said plurality of clamps to said top member.

4. The vibratory drive unit of claim 3 wherein said fastener is externally threaded.

5. The vibratory drive unit of claim 4 wherein said top member includes a plurality of threaded bores adapted to threadingly receive a corresponding one of said fasteners therein.

6. A vibratory drive unit for cooperative engagement with a parts feeder bowl having a bottom wall and an outside wall connected thereto, the bottom wall having a flange extending therefrom, the vibratory drive unit comprising:

a top member for mounting the parts feeder bowl thereto;

a plurality of clamp nuts for clamping the flange of the parts feeder bowl to said top member;

a fastener engageable between each of said clamp nuts and said top member for adjustably clamping the flange therebetween, said top member and said clamp nuts being matingly configured to prevent rotation of said clamp nuts as the flange is adjustably clamped therebetween; and means for vibrating said top member.

7. The vibratory drive unit of claim 6 wherein each of said clamp nuts have a polygonal exterior shape.

8. The vibratory drive unit of claim 7 wherein said top member defines a plurality of channels therein, each of said plurality of channels being configured to slidingly receive a corresponding one of said plurality of clamp nuts therein to thereby prevent relative rotation therebetween.

9. The vibratory drive unit of claim 8 wherein said fastener is externally threaded;

and wherein said top member includes a plurality of threaded bores adapted to threadingly receive a corresponding one of said fasteners therein.

10. The vibratory drive unit of claim 9 wherein said means for vibrating said top member includes:

a base member; and a plurality of drive springs connected between said top member and said base member.

11. The vibratory drive unit of claim 10 wherein the outside wall of the feeder bowl extends away from the bottom wall in a first direction to an open top;

and wherein the flange extends away from said bottom wall in a second direction opposite said first direction.

12. A vibratory drive unit for cooperative engagement with a parts feeder bowl having a bottom wall and an outside wall extending therefrom in a first direction to an open top, the bottom wall having a flange extending therefrom in a second direction opposite said first direction, the vibratory drive unit comprising:

a top member for mounting the parts feeder bowl thereto;

a plurality of clamp nuts for clamping the flange of the parts feeder bowl to said top member;

a fastener engageable between each of said clamp nuts and said top member for adjustably clamping the flange therebetween, said top member defining a flange support surface between the flange and said fastener to prevent the flange from contacting said fastener as the feeder bowl is mounted to said top member; and means for vibrating said top member.

13. The vibratory drive unit of claim 12 wherein each of said clamp nuts have a polygonal exterior;

and wherein said top member includes a top surface defining a plurality of channels therein, each of said plurality of channels being configured to slidingly receive a corresponding one of said plurality of clamp nuts therein to thereby prevent relative rotation therebetween.

14. The vibratory drive unit of claim 13 wherein said fastener is externally threaded;

and wherein said top member includes a threaded bore within each of said plurality of channels adapted to threadingly receive a corresponding one of said fasteners therein.

15. The vibratory drive unit of claim 14 wherein said means for vibrating said top member includes:

a base member; and a plurality of drive springs connected between said top member and said base member.

16. The vibratory drive unit of claim 15 wherein said flange support surface includes a portion of said top surface on either side of each of said channels.

17. A vibratory parts feeder for cooperative engagement with a parts feeder bowl having a bottom wall and a cylindrical outside wall connected thereto, the bottom wall having one of a first diameter circumferential flange and a second larger diameter circumferential flange extending therefrom, the vibratory parts feeder comprising:

a top member for mounting the parts feeder bowl thereto, said top member defining a plurality of first radial walls each adapted to engage a portion of an inner surface of said first diameter flange;

a plurality of extension blocks each having a first face adapted to matingly engage one of said first radial walls and an opposite second face defining a second radial wall adapted to engage a portion of an inner surface of said second diameter flange;

a plurality of clamp nuts for clamping one of said first diameter flange to said plurality of first radial walls and said second diameter flange to said plurality of second radial walls;

a fastener engageable between each of said clamp nuts and said top member for adjustably clamping one of said first and second diameter flanges therebetween; and means for vibrating said top member.

18. The vibratory drive unit of claim 17 wherein said top member defines a flange support surface between the flange and said fastener to prevent the flange from contacting said fastener as the feeder bowl having said first diameter flange is mounted to said top member.

19. The vibratory drive unit of claim 18 wherein each of said clamp nuts have a polygonal exterior;

and wherein said top member includes a top surface defining a plurality of channels therein, each of said plurality of channels being configured to slidingly receive a corresponding one of said plurality of clamp nuts therein to thereby prevent relative rotation therebetween.

20. The vibratory drive unit of claim 19 wherein said flange support surface includes a portion of said top surface on either side of each of said channels.

21. The vibratory drive unit of claim 20 wherein said fastener is externally threaded;

and wherein said top member includes a threaded bore within each of said plurality of channels adapted to threadingly receive a corresponding one of said fasteners therein.

22. The vibratory drive unit of claim 21 wherein said means for vibrating said top member includes:

a base member; and a plurality of drive springs connected between said top member and said base member.

23. The vibratory drive unit of claim 22 wherein said base member and said top member are configured such that said plurality of drive springs may be selectively connected thereto for vibrating said top member in one of a first direction and a second opposite direction.

24. The vibratory drive unit of claim 17 wherein said top member includes a top surface defining a plurality of channels therein, each of said plurality of channels configured to slidingly receive one of said extension block therein such that relative rotation therebetween is prevented.

25. The vibratory drive unit of claim 24 wherein each of said clamp nuts defines a first clamp face having a first partial flange support surface directed toward a corresponding one of said extension blocks;

and wherein said second face of each of said extension blocks defines a second partial flange support surface directed toward a corresponding one of said clamp nuts such that said first and second partial flange support surfaces define a flange support surface between the flange and said fastener to support the flange and thereby prevent the flange from contacting said fastener as the feeder bowl having said second diameter flange is mounted to said top member.

26. The vibratory drive unit of claim 25 wherein each of said clamp nuts has a polygonal exterior;

and wherein said second face of each of said extension blocks includes a channel configured for receiving a first clamp face of one of said clamp nuts therein to prevent relative rotation therebetween as said fastener adjustably clamps said second diameter flange therebetween.

27. The vibratory drive unit of claim 26 wherein said fastener is externally threaded;

and wherein said top member includes a threaded bore within each of said plurality of channels adapted to threadingly receive a corresponding one of said fasteners therein.

28. The vibratory drive unit of claim 27 wherein said means for vibrating said top member includes:

a base member; and a plurality of drive springs connected between said top member and said base member.

29. The vibratory drive unit of claim 28 wherein said base member and said top member are configured such that said plurality of drive springs may be selectively connected thereto for vibrating said top member in one of a first direction and a second opposite direction.

\* \* \* \* \*